(12) United States Patent
Genden et al.

(10) Patent No.: US 10,108,423 B2
(45) Date of Patent: Oct. 23, 2018

(54) HISTORY BUFFER WITH SINGLE SNOOP TAG FOR MULTIPLE-FIELD REGISTERS

(71) Applicant: International Business Machines Corporation, Armonk, NY (US)

(72) Inventors: Michael J. Genden, Austin, TX (US); Dung Q. Nguyen, Austin, TX (US); Kenneth L. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/667,902

(22) Filed: Mar. 25, 2015

(65) Prior Publication Data
US 2016/0283236 A1    Sep. 29, 2016

(51) Int. Cl.
*G06F 9/30*      (2018.01)
*G06F 9/38*      (2018.01)

(52) U.S. Cl.
CPC ...... *G06F 9/30127* (2013.01); *G06F 9/30101* (2013.01); *G06F 9/30105* (2013.01); *G06F 9/30123* (2013.01); *G06F 9/3859* (2013.01); *G06F 9/3863* (2013.01); *G06F 9/30116* (2013.01); *G06F 9/3844* (2013.01)

(58) Field of Classification Search
CPC ............... G06F 9/3863; G06F 9/30116; G06F 9/30123; G06F 9/30127
USPC ........................................................ 712/228
See application file for complete search history.

(56) References Cited

U.S. PATENT DOCUMENTS

| 5,367,703 | A | * | 11/1994 | Levitan | G06F 9/3844 |
| | | | | | 712/23 |
| 6,098,167 | A | | 8/2000 | Cheong et al. | |
| 6,128,722 | A | * | 10/2000 | Fry | G06F 9/3836 |
| | | | | | 712/23 |
| 6,370,639 | B1 | * | 4/2002 | Huck | G06F 9/30094 |
| | | | | | 712/222 |
| 6,654,869 | B1 | | 11/2003 | Kahle et al. | |
| 8,245,018 | B2 | | 8/2012 | Nguyen | |
| 2004/0015683 | A1 | * | 1/2004 | Emma | G06F 9/3806 |
| | | | | | 712/240 |
| 2009/0063823 | A1 | * | 3/2009 | Burky | G06F 9/3838 |
| | | | | | 712/216 |
| 2010/0169622 | A1 | * | 7/2010 | Nguyen | G06F 9/3863 |
| | | | | | 712/228 |
| 2010/0262812 | A1 | * | 10/2010 | Lopez | G06F 9/30043 |
| | | | | | 712/228 |
| 2012/0017214 | A1 | * | 1/2012 | Shannon | G06F 9/30134 |
| | | | | | 718/100 |
| 2016/0246728 | A1 | * | 8/2016 | Ron | G06F 9/30098 |

* cited by examiner

*Primary Examiner* — Yuqing Xiao
*Assistant Examiner* — Aaron B. Pederson
(74) *Attorney, Agent, or Firm* — VanLeeuwen & VanLeeuwen; Steven L. Bennett

(57) ABSTRACT

An approach is provided in which a mapper control unit matches a result instruction tag corresponding to an executed instruction to a history buffer entry's instruction tag. The matched history buffer entry includes multiple history buffer field sets that each include a field set state indicator. The mapper control unit identifies a subset of the history buffer field sets having a valid field set state indicator and stores result data corresponding to the result instruction tag in the identified subset of history buffer field sets. In turn, the mapper control unit restores a subset of a register's fields utilizing content from the subset of history buffer field sets.

20 Claims, 12 Drawing Sheets

HISTORY BUFFER WITH SINGLE SNOOP TAG FOR MULTIPLE-FIELD REGISTERS

BACKGROUND

The present disclosure relates to a multi-field set history buffer with a single write-back snoop tag that supports multi-field registers utilized by an information handling system.

Modern information handling systems typically implement out-of-order microprocessor designs that store register contents at "checkpoints" so the microprocessor can revert back to a register state prior to an interruption if required, such as during a branch instruction. For example, when a processor reaches a branch instruction, the processor selects a most likely path and begins to process instructions down the selected path. However, the processor stores register contents at the branch in case the selected path is the incorrect path and the processor needs to revert back to the register state prior to the mis-predicted path.

One location that a processor stores the register contents at checkpoints is in history buffers. Traditional history buffers allow a processor to store the entire contents of a particular register in a history buffer entry, such as storing the entire contents of a general purpose register (GPR) into a single history buffer entry. Each history buffer entry includes a single instruction tag (itag) field that stores an itag value from the GPR, which the processor utilizes to determine which history buffer content should be restored into specific registers if required.

Unlike GPRs, however, exception and status registers (e.g., FPSCR, XER, CR, etc.) consist of multiple fields, each having their own instruction tag (itag), which a processor may independently update. During data results write-back, a processor matches the write-back's corresponding write-back tag with the itags in the registers and history buffers to determine location(s) at which to store the corresponding result data.

BRIEF SUMMARY

According to one embodiment of the present disclosure, an approach is provided in which a mapper control unit matches a result instruction tag corresponding to an executed instruction to a history buffer entry's instruction tag. The matched history buffer entry includes multiple history buffer field sets that each include a field set state indicator. The mapper control unit identifies a subset of the history buffer field sets having a valid field set state indicator and stores result data corresponding to the result instruction tag in the identified subset of history buffer field sets. In turn, the mapper control unit restores a subset of a register's fields utilizing content from the subset of history buffer field sets.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
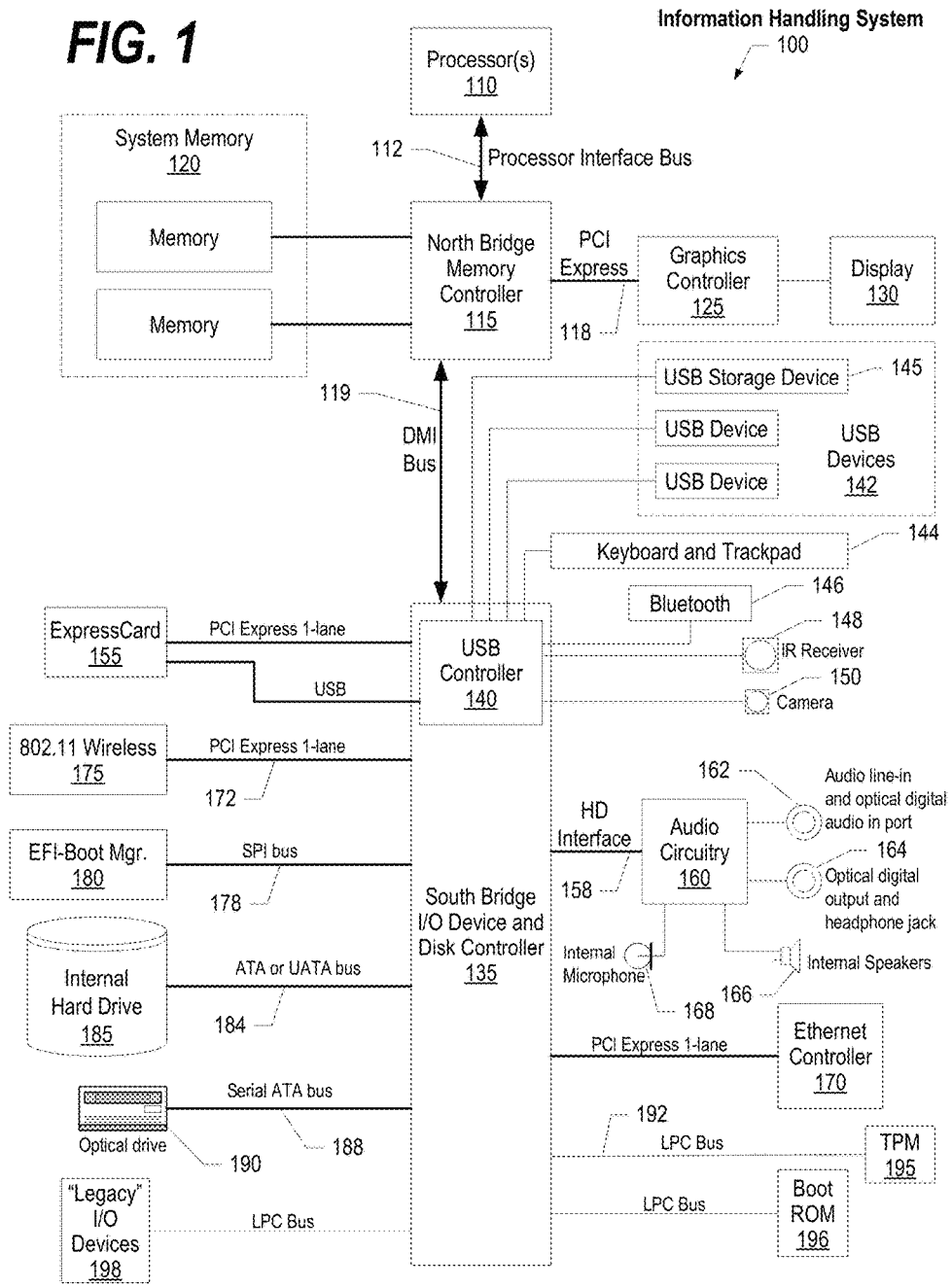
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein.

Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
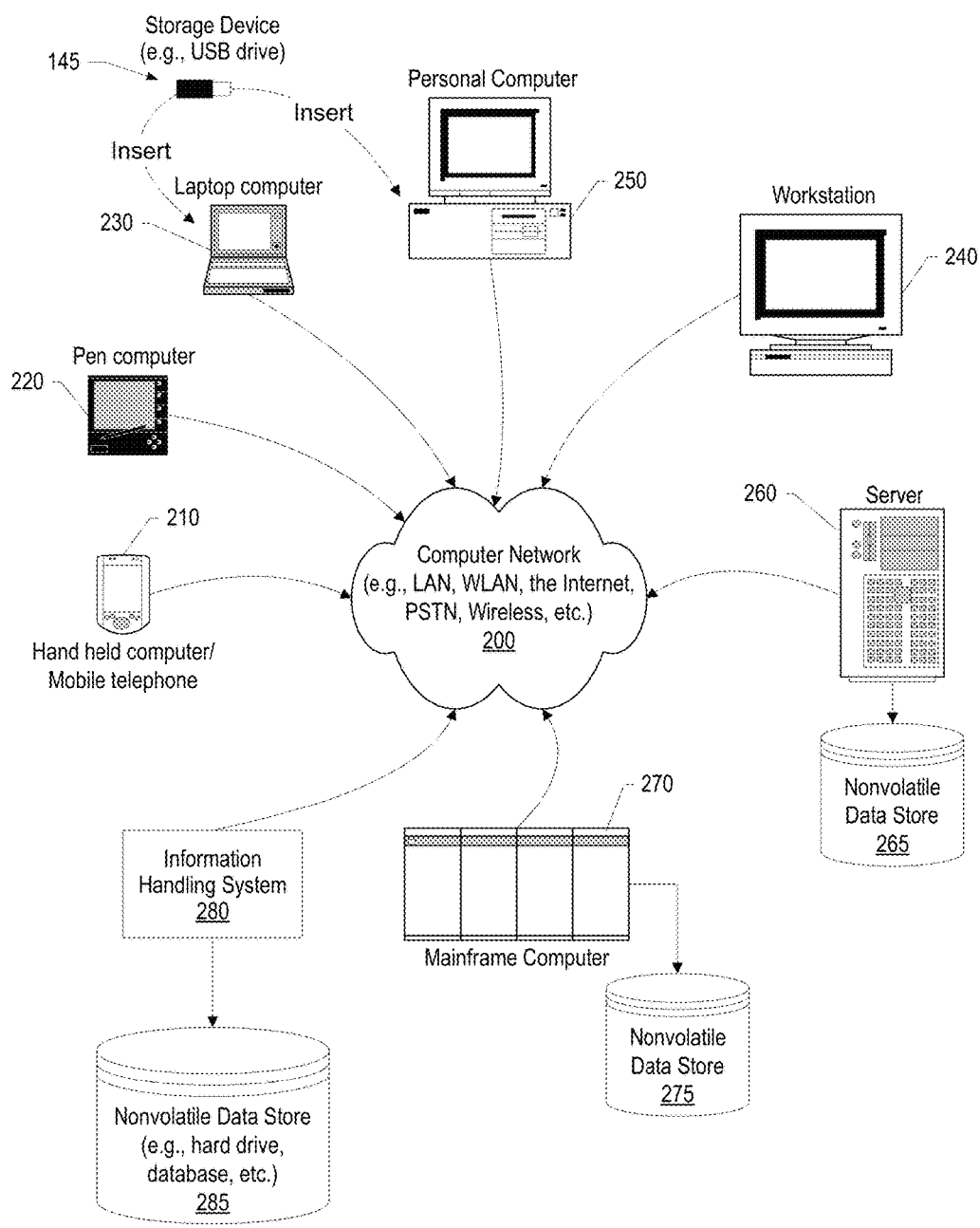
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-12 depict an approach that can be executed on an information handling system. The information handling system includes a mapper control unit and a dynamic history buffer that preserves multi-field register information. The mapper control unit receives dispatch information corresponding to a dispatching instruction that targets register fields, and transfers existing content from the targeted register fields into a history buffer entry that the mapper control unit dynamically configures to store the multi-field content. Each history buffer entry includes an itag field and multiple field sets, each having their own field set state indicator, etag field, and variable data width field. When the mapper control unit matches a snooped result instruction tag corresponding to an executed instruction with a history buffer entry's itag, the mapper control unit stores corresponding result data in history buffer entry field sets that include a valid field set state indicator. When the mapper control unit receives information to restore a register, the mapper control unit restores, in one embodiment, different register fields using different history buffer entries.

Figure 3:
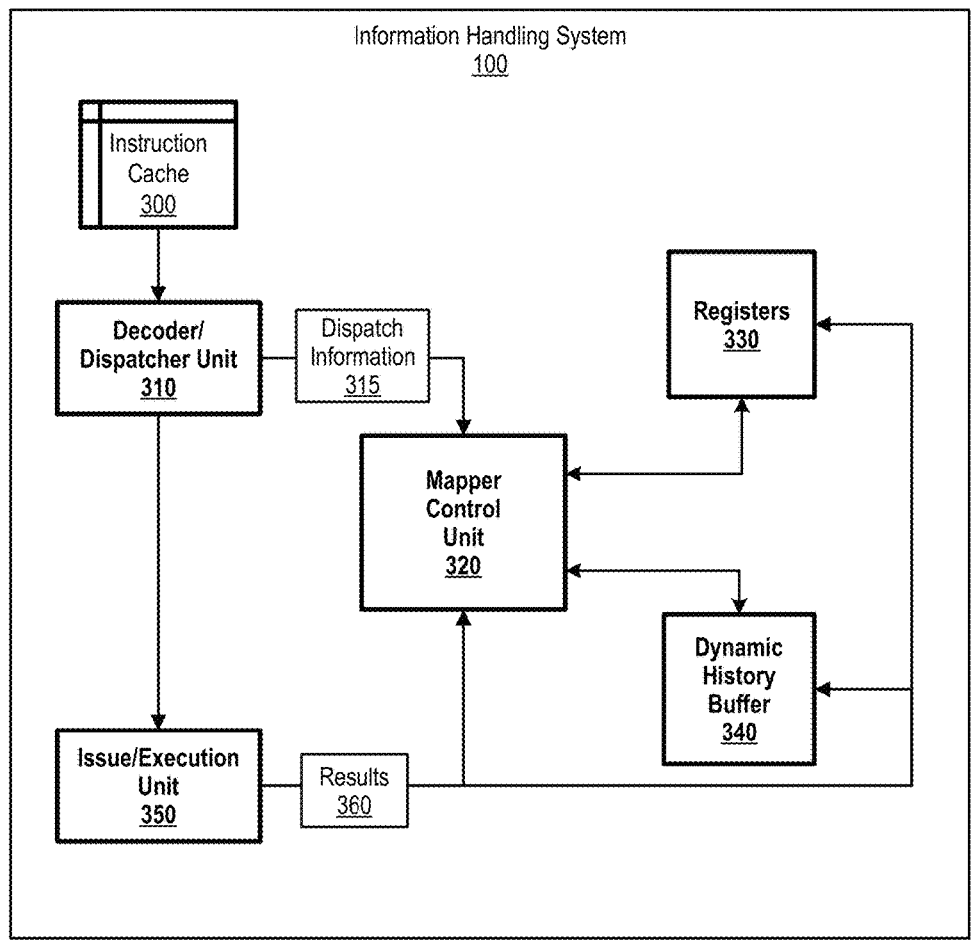
FIG. 3 is an exemplary diagram depicting a mapper control unit that preserves existing content from targeted registers on a per-field basis into a dynamic history buffer.

FIG. 3 is an exemplary diagram depicting a mapper control unit that preserves existing content from targeted registers on a per-field basis into a dynamic history buffer. Information handling system 100 includes instruction cache 300 that stores fetched instructions ready for dispatch. Decoder/dispatcher unit 310 retrieves an instruction from instruction cache 300, dispatches the instruction to issue/execution unit 350, and generates dispatch information 315 to send to mapper control unit 320. Dispatch information 315 includes the instruction's instruction tag (itag), whether the instruction is an interruptible instruction (e.g., a branch instruction), and also includes target register information such as register identifiers and register field identifiers.

Mapper control unit 320 analyzes dispatch information 315 as well as control information corresponding to the targeted register fields in registers 330 to determine whether register content should be preserved into dynamic history buffer 340. For example, if dispatch information 315 indicates that the instruction is interruptible, mapper control unit 320 determines that the targeted register contents should be preserved in order to be able to revert back to a register state prior to the interruptible instruction if needed (see FIG. 5, and corresponding text for further details).

When mapper control unit 320 determines that the targeted register contents should be preserved, mapper control unit 320 selects an available dynamic history buffer entry in dynamic history buffer 340 and transfers the targeted register (s) contents on a per-field basis into the selected dynamic history buffer entry. Once mapper control unit 320 transfers the targeted registers' existing contents, mapper control unit 320 stores dispatch information 315 (or portions thereof) into the targeted register fields.

Issue/execution unit 350 finishes executing the instruction and sends results 360 to mapper control unit 320 that, in one embodiment, include a result instruction tag and result data. The result instruction tag corresponds to the instruction tag of the executed instruction. Mapper control unit 320 compares the result instruction tag with the dynamic history buffer 340's history buffer entry itags to determine whether a match exists. If a match exists, mapper control unit 320 stores the result data from results 360 into the matching history buffer entry's field sets that include a valid field set state indicator (see FIG. 8 and corresponding text for further details). Likewise, mapper control unit 320 compares the result instruction tag with register 330's itags and stores the result data in register 330's corresponding fields.

Figure 4:
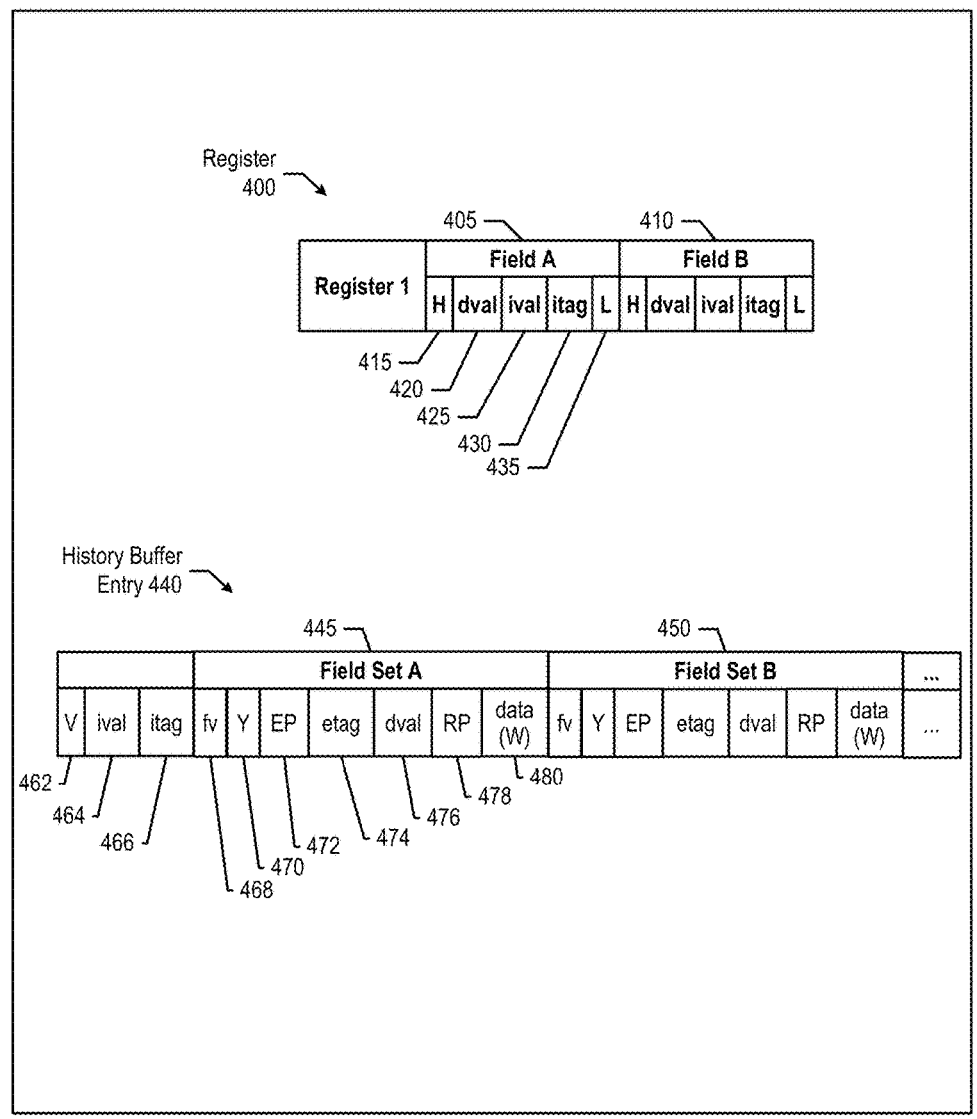
FIG. 4 is an exemplary diagram depicting a register and a history buffer entry.

FIG. 4 is an exemplary diagram depicting a register and a history buffer entry. Register 400, which is part of registers 330, includes multiple fields that store control information and data with varying widths. Likewise, history buffer entry 440, which is included in dynamic history buffer 340, adapts to store the control information and data with varying widths from register entry 400. As such, dynamic history buffer 340 efficiently stores/restores register contents from registers 330 that have multiple data fields each having their own control fields.

Register 400 includes field A 405 and field B 410. As those skilled in the art can appreciate, register 400 may include more or less fields than the example shown in FIG. 4. Each of field A 405 and field B 410 include history (H) bits 415, data valid (dval) bits 420, instruction valid (ival) bits 425, instruction tag (itag) bits 430, and last (L) bits 435.

History (H) bits 415 are asserted when an interruptible instruction is dispatched and indicates that contents in the corresponding field should be saved to the history buffer the next time the field is a target of a dispatched instruction. For example, if an interruptible instruction targets field B 410, field B 410's information is stored in a history buffer entry and field A 405's H bit 415 is set such that field A 405's contents are stored in the history buffer the next time that field A 405 is a target of a dispatched instruction.

Data valid (dval) bits 420 indicate that the corresponding register field has valid data (not shown). In one embodiment, a "1" indicates that valid data is in the register field's corresponding data field, and a "0" indicates that the data is not yet generated and stored (e.g., from results 360).

Itag Valid (ival) bits 425 indicate that the corresponding register field's itag 430 is valid (e.g., asserted at dispatch, cleared at completion). In one embodiment, ival 425 is utilized to determine a relative age of the register field contents in case the field is saved in a history buffer entry and an interrupt occurs (see FIG. 10 and corresponding text for further details). Itag 430 stores the instruction tag of the instruction that generates the register field's data via results 360. Last (L) bits 435 indicate that the corresponding register field was a target of the most recent dispatched instruction that targeted any field in the register. For example, field A 405's L bit 435 is set when a dispatched instruction targets field A 405 (see FIG. 8 and corresponding text for further details).

History buffer entry 440 includes a set of entry-specific fields 462, 464, and 466, and multiple sets of field set fields 468-480. Entry valid (V) field 462 is asserted when a corresponding history buffer entry is allocated to store register contents, and cleared on a flush and at completion of an evictor tag (etag). Itag valid (ival) field 464 indicates that the itag value in itag field 466 is valid. Itag (instruction tag) field 466 stores an itag value of an instruction (copied from a targeted register field 430) that generates the field set's data 480.

Field set A 445 and field set B 450 each includes a set of control fields 468 through 478 and a data field 480. As discussed herein, a "field set" includes a set of control fields and a data field (468-480) and history buffer entry 440 includes multiple field sets (445, 450, etc.) and a set of entry-specific fields 462-466.

Field valid (fv) field 468 indicates that the corresponding history buffer field set's contents are valid. As discussed herein, field valid field 468 is also referred to herein as a field set state indicator. Youngest (Y) bits 470 indicate that the field set is the youngest entry for the particular history buffer field set (e.g., field set A). In one embodiment during the restore process (e.g., FIG. 10), a field is restored to the register when the history buffer entry's field set includes RP=1 and Y=1. In this embodiment, when a flush occurs, dynamic history buffer 340 may have multiple entries that have RP asserted for the same field set because contents are stored to the history buffer when any targeted field has H=1. However, the mapper control unit 320 selects the one of the multiple entries having a Y=1 to restore the register contents.

For example, assuming field A has L=1 and H=0, field B has L=1 and H=1, and a dispatched instruction is "non-interruptible" and targets both Fields A and B, mapper control unit 320 allocates a new history buffer entry to save the contents of field B because H=1. The new history buffer entry also stores the contents of field A because L=1, indicating that fields A and B were previously written by the same instruction. The new history buffer entry has younger field A contents than a previous entry that has valid field A contents. In turn, when a flush occurs, the mapper control unit asserts the RP field in both history buffer entries. As such, the mapper control unit restores the history buffer entry that has Y=1 (see FIG. 10 and corresponding text for further details).

Evictor pending (EP) bits 472 indicate that the field set's evictor tag 474 is pending. Data valid (dval) field 476 indicates that the data stored in data field 480 is valid. In one embodiment, data field 480 is a variable length data field and supports multiple register types. For example, a first register type may store data in 8-byte chunks and a second register type may store data in 32-byte chunks. In this example, mapper control unit 320 adjusts the size of data field 480 based upon the size of the data to be stored in data field 480.

Recovery pending (RP) field 478 indicates that the corresponding field set should be restored into a corresponding register during a flush cycle. In one embodiment, due to dynamic history buffer 340's nature of independently supporting different field sets, field set A 445's RP bit may be set in a different history buffer entry than field set B 450's RP bit (see FIGS. 10, 11, and corresponding text for further details). Data (W) field 480 stores the data from results 360 during a write-back (e.g., finish cycle) corresponding to the itag value in 466.

Figure 5:
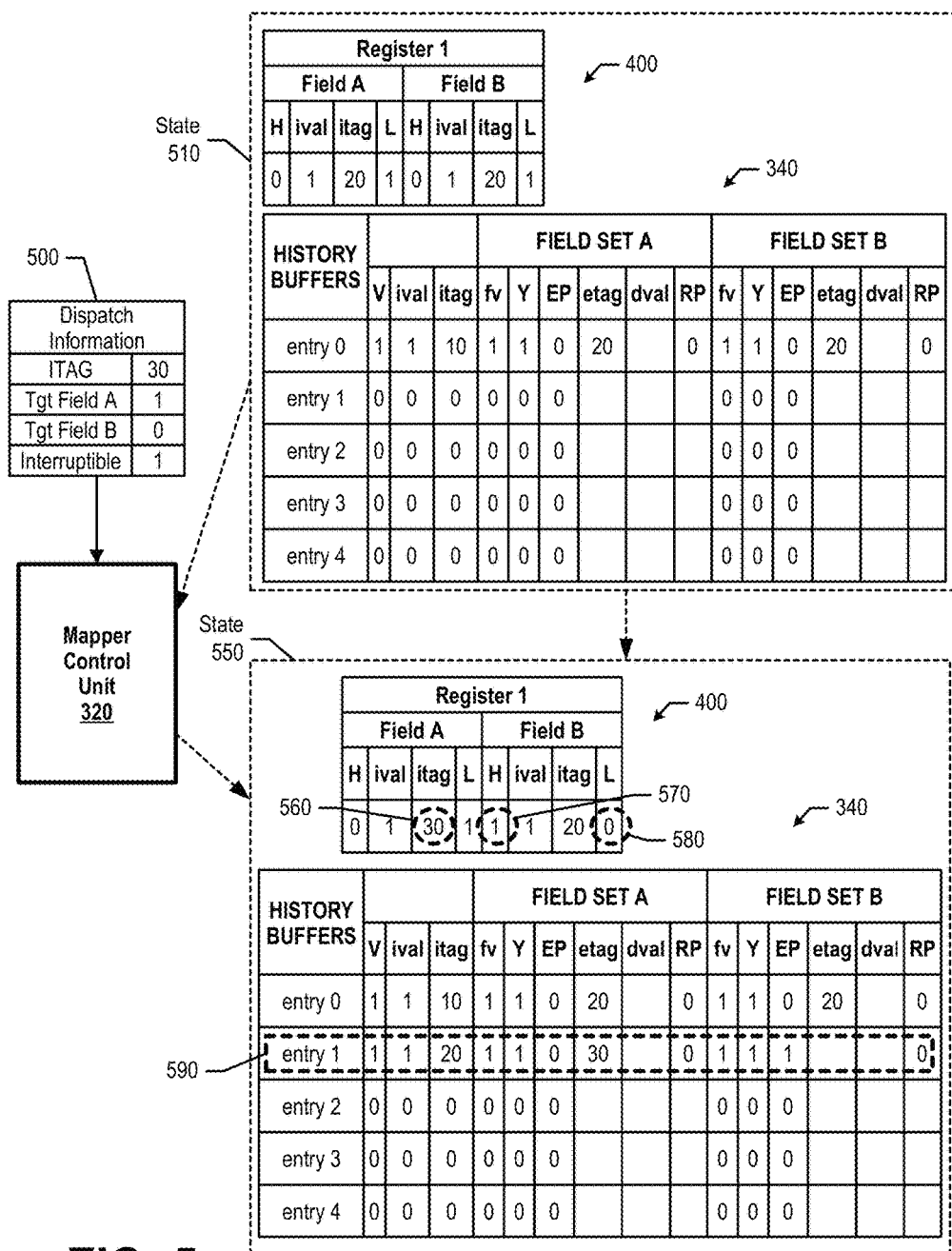
FIG. 5 is an exemplary diagram depicting a mapper control unit receiving dispatch information from an interruptible instruction that targets a subset of register fields.

FIG. 5 is an exemplary diagram depicting a mapper control unit receiving dispatch information from an interruptible instruction that targets a subset of register fields. Mapper control unit 320 receives dispatch information 500, which includes an itag of 30, targets field A, and corresponds to an interruptible instruction. State 550 shows that, relative to previous state 510, mapper control unit 320 replaces register 400's itag 20 with an itag of 30 in field A (560) because field A is a target of dispatch information 500.

Mapper control unit 320 does not modify field B's itag but, instead, asserts the H bit for field B (570) because field B is not targeted and the instruction is interruptible. The asserted H bit indicates that the contents of register field B should be stored in the history buffer the next time that an instruction targets register field B. Mapper control unit 320 also clears the L bit for field B (580) because field B is not targeted by the most recent dispatched instruction (dispatch information 500).

Regarding the dynamic history buffer 340, mapper control unit 320 saves register 400's previous contents from state 530 into history buffer entry 590 because the dispatched instruction is interruptible. This includes assigning, in entry 590, a 1 to both the fv and Y bits in both fields because both fields previously had L=1 from state 530. Mapper control unit 320 assigns an etag of 30 for field A in entry 590 because the dispatched instruction, with an itag of 30, targets register field A. Finally, mapper control unit 320 assigns a 1 to field set B's EP bits because the dispatched instruction does not target register field B. Mapper control unit 320 utilizes the EP values when a subsequent dispatched instruction targets the field to save the instruction's itag as the evictor tag (etag) for that field (see FIG. 6 and corresponding text for further details).

Figure 6:
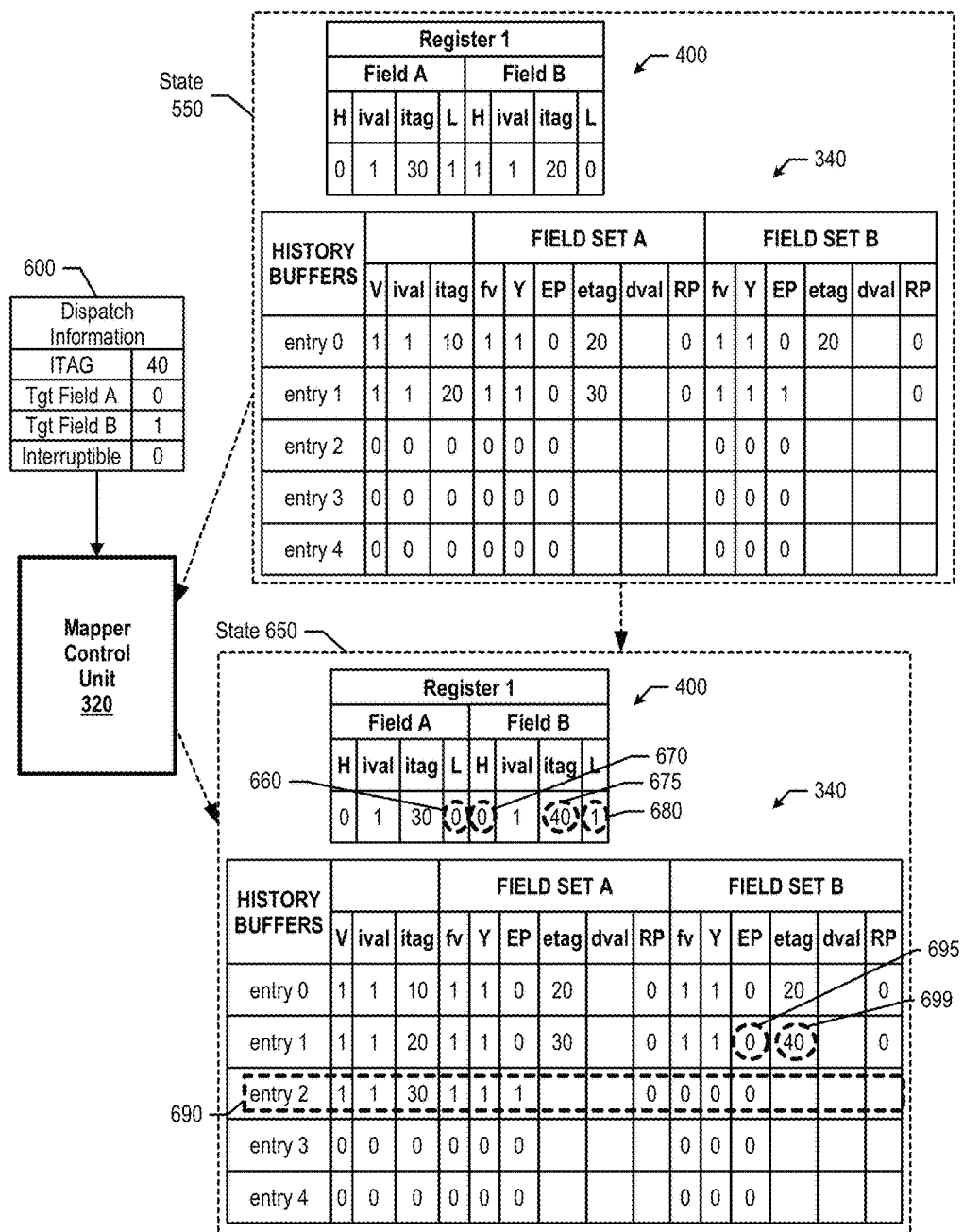
FIG. 6 is an exemplary diagram depicting a mapper control unit receiving dispatch information corresponding to a non-interruptible instruction that targets a subset of register fields.

FIG. 6 is an exemplary diagram depicting a mapper control unit receiving dispatch information corresponding to a non-interruptible instruction that targets a subset of register fields. Mapper control unit 320 receives dispatch information 600, which includes an itag of 40, targets field B, and corresponds to a non-interruptible instruction. State 650 shows that, relative to state 550 (from FIG. 5), mapper control unit 320 clears field A's L bit (660) because field A is not targeted, and asserts field B's L bit (680) because field B is targeted.

Mapper control unit 320 generates history buffer entry 690 to save register field B's contents because field B is targeted and previously had H=1 (from state 550). Entry 690 shows that mapper control unit assigns a 1 to field set A's fv bits and Y bits because register field A previously had L=1 (from state 550).

Entry 690 also shows that mapper control unit 320 assigns EP=1 for field set A to indicate that register field A's contents are saved to entry 690 but register field A's contents were not actually evicted from the register because register field A was not targeted by the dispatched instruction. Mapper control unit 320 assigns fv=0 for field set B because register field B previously had L=0 (from state 550), indicating that the contents of register field B were already saved and field set B is not valid for entry 690 because field B has an itag=20 and entry 690 has itag=30.

Mapper control unit 320 assigns etag=40 in entry 1 (699) and clears the EP bit for field set B of older history buffer entries that had EP=1 (695) because the field set B is targeted and previously had H=1 (from state 550). Mapper control unit 320 performs these steps because register field B was previously saved in entry 1 but had not yet been evicted from the register, in which case register field B's H bit remained asserted. Now that dispatch information 600 (itag=40) targets register field B, itag 40 becomes field set B's evictor tag in entry 1. The EP (evictor pending) bit is cleared for entry 1 field set B because field B contents are now evicted from the register. In turn, mapper control unit 320 clears register field B's H bit (670) because its previous contents have now been saved in entry 690.

Figure 7:
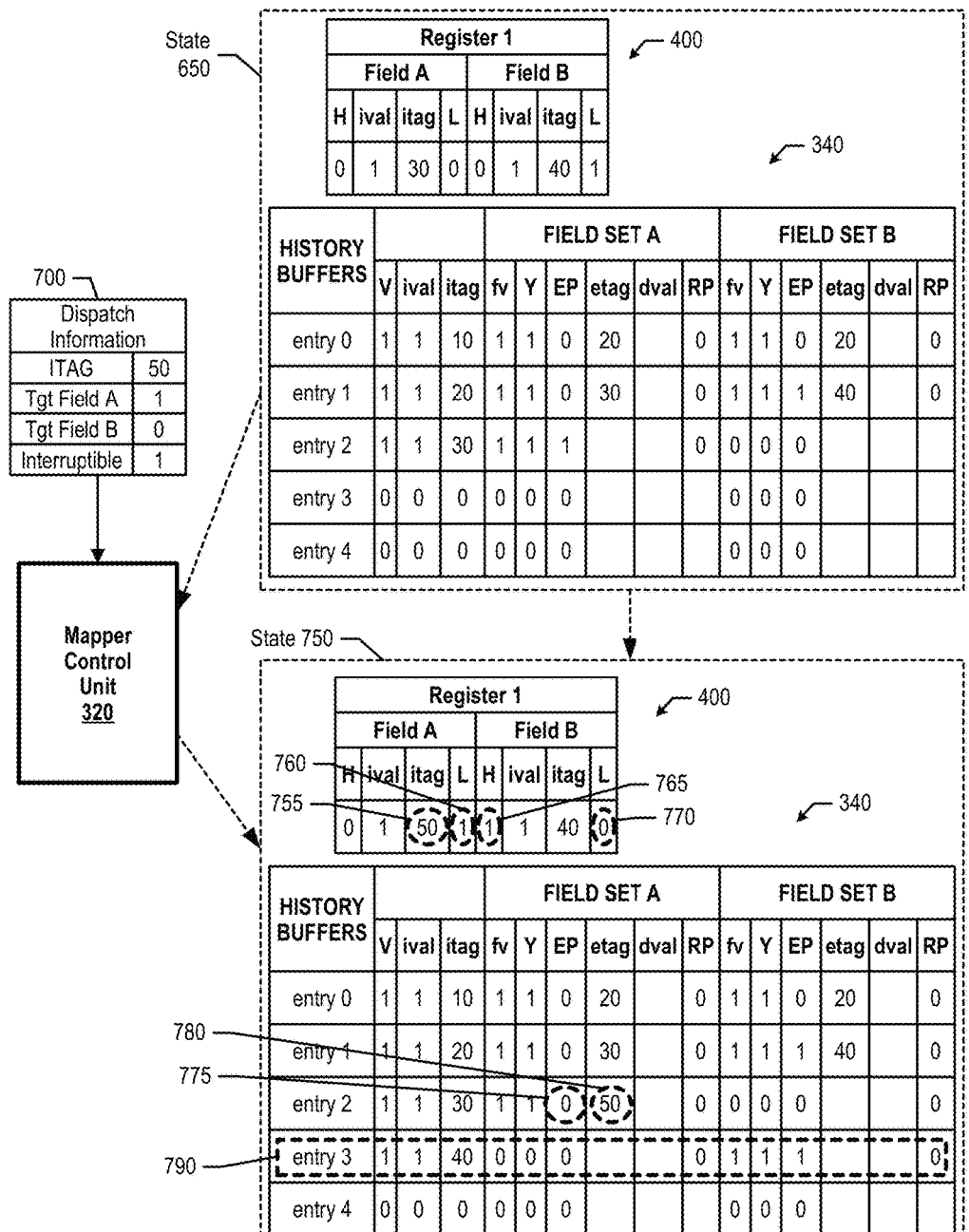
FIG. 7 is an exemplary diagram depicting a mapper control unit receiving dispatch information from an interruptible instruction that targets a subset of register fields.

FIG. 7 is an exemplary diagram depicting a mapper control unit receiving dispatch information from an interruptible instruction that targets a subset of register fields. Mapper control unit 320 receives dispatch information 700, which includes an itag of 50, targets field A, and corresponds to an interruptible instruction.

State 750 shows that, relative to state 650 (from FIG. 6), mapper control unit 320 modifies register 400 and dynamic history buffer 340 in multiple ways. Regarding register 400, mapper control unit 320 asserts L=1 for register field A (760) because register field A is targeted. Mapper control unit 320 clears the L bit for register field B (770) because field B is not targeted, and asserts field B's H bit (765) because field B is not targeted and the instruction is interruptible.

Regarding dynamic history buffer 340, mapper control unit 320 saves the previous contents of register field A (from state 650) in history buffer entry 790 because the dispatched instruction is interruptible. Mapper control unit 320 assigns fv=0 for entry 790's field set A because register field A previously had L=0 (from state 650), thus indicating that field A is not valid for entry 790, because entry 3 is for itag 40 and field A had itag 30. Data for itag 30 will be captured in entry 2. Mapper control unit 320 assigns fv=1 and Y=1 for field set B because register field B previously had L=1 (from state 650).

In addition, mapper control unit 320 assigns EP=1 for entry 790's field set B because register field B is not targeted by the dispatched instruction. Finally, mapper control unit 320 modifies older history buffer entries that had EP=1 by assigning an etag=50 (780) and clearing the EP bit (775) for field set A because the dispatched instruction is interruptible and targets register field A.

Figure 8:
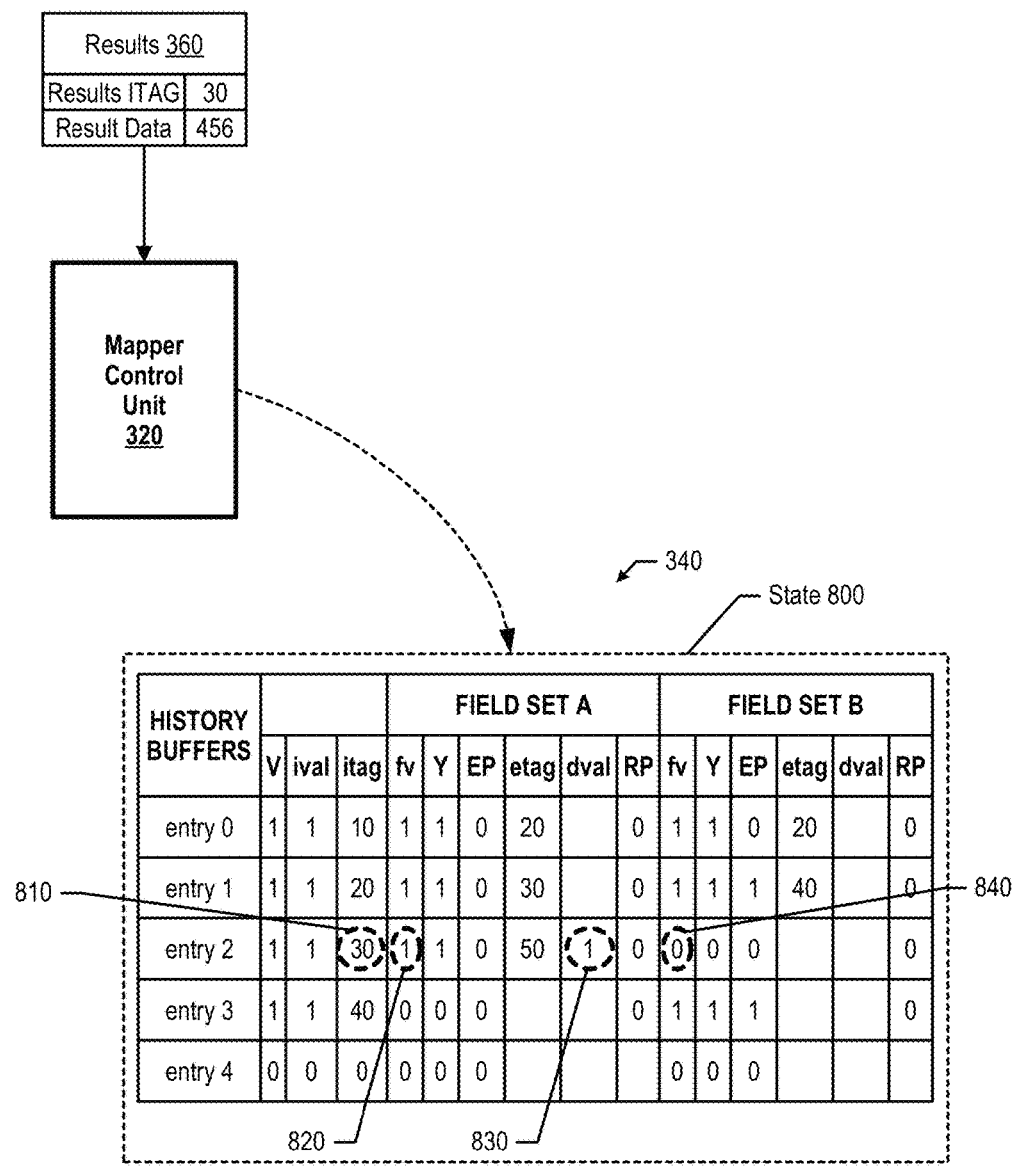
FIG. 8 is an exemplary diagram depicting a mapper control unit receiving results information corresponding to an executed instruction.

FIG. 8 is an exemplary diagram depicting a mapper control unit receiving results information corresponding to an executed instruction. Results 360 include a result instruction tag of 30, indicating that the result data "456" is the result from instruction 30 completing execution.

Mapper control unit 320 compares the result instruction tag of 30 with the history buffer entries in dynamic history buffer 340 and identifies a match in entry 2's itag 810. As such, mapper control unit 320 analyzes history buffer entry 2's field set A and field set B to determine if either field set includes a valid field set state indicator (820 and 840). Mapper control unit 320 determines that field set A includes a valid field set state indicator and, in turn, stores the result data from results 360 into a data field of field set A (480 from FIG. 4), and sets field set A's data valid bit 830 accordingly, indicating that valid data is stored in the data field.

Figure 9:
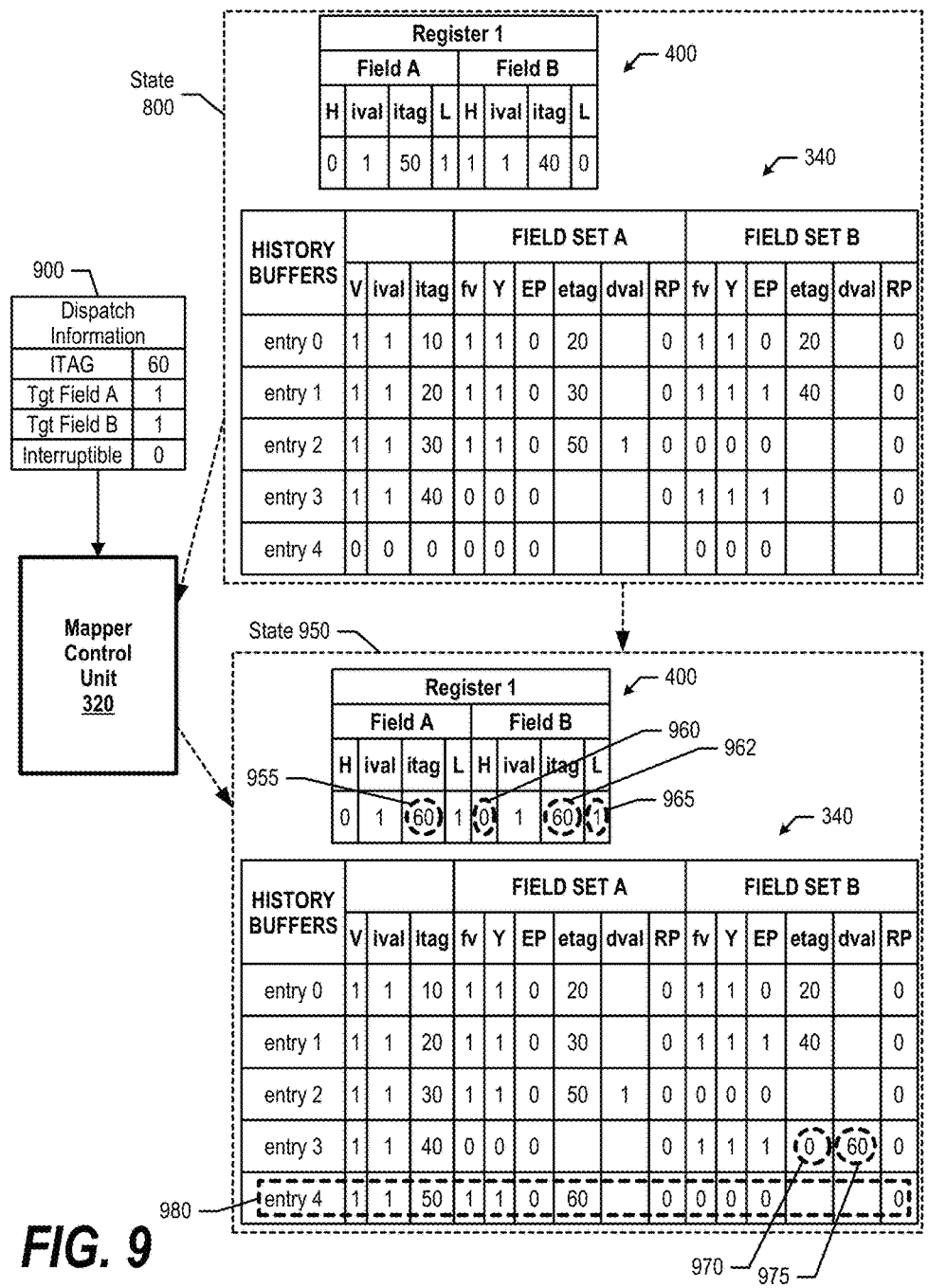
FIG. 9 is an exemplary diagram depicting a mapper control unit receiving dispatch information corresponding to an interruptible instruction that targets both fields in a register.

FIG. 9 is an exemplary diagram depicting a mapper control unit receiving dispatch information corresponding to an interruptible instruction that targets both fields in a register. Mapper control unit 320 receives dispatch information 900, which includes an itag of 60, targets fields A and B, and is interruptible.

State 950 shows that, relative to state 800 (from FIG. 8), mapper control unit 320 modifies register 400 and dynamic history buffer 340. Regarding register 400, mapper control unit 320 replaces itag 50 in field A (955) and replaces itag 40 in field B (962) with itag 60 because both fields are targeted. Mapper control unit 320 asserts L=1 for field B (965) because field B is targeted (field A's L bit already asserted). Mapper control unit 320 clears field B's H bit (960) because its previous contents are saved in the dynamic history buffer entry 980 (discussed below).

Regarding dynamic history buffer 340, mapper control unit 320 saves the previous contents of register field B to entry 980 because register 400's field B is targeted and previously had H=1 (from state 800). Mapper control unit 320 assigns fv=1 and Y=1 for entry 980's field set A because register field A previously had L=1 (from state 800), and assigns fv=0 for field set B because register field B field previously had L=0 (from state 800).

Finally, mapper control unit 320 modifies older history buffer entries that had EP=1 by assigning an etag=60 (975) and clearing the EP bit (970) for field set B because the dispatched instruction targets register field B.

Figure 10:
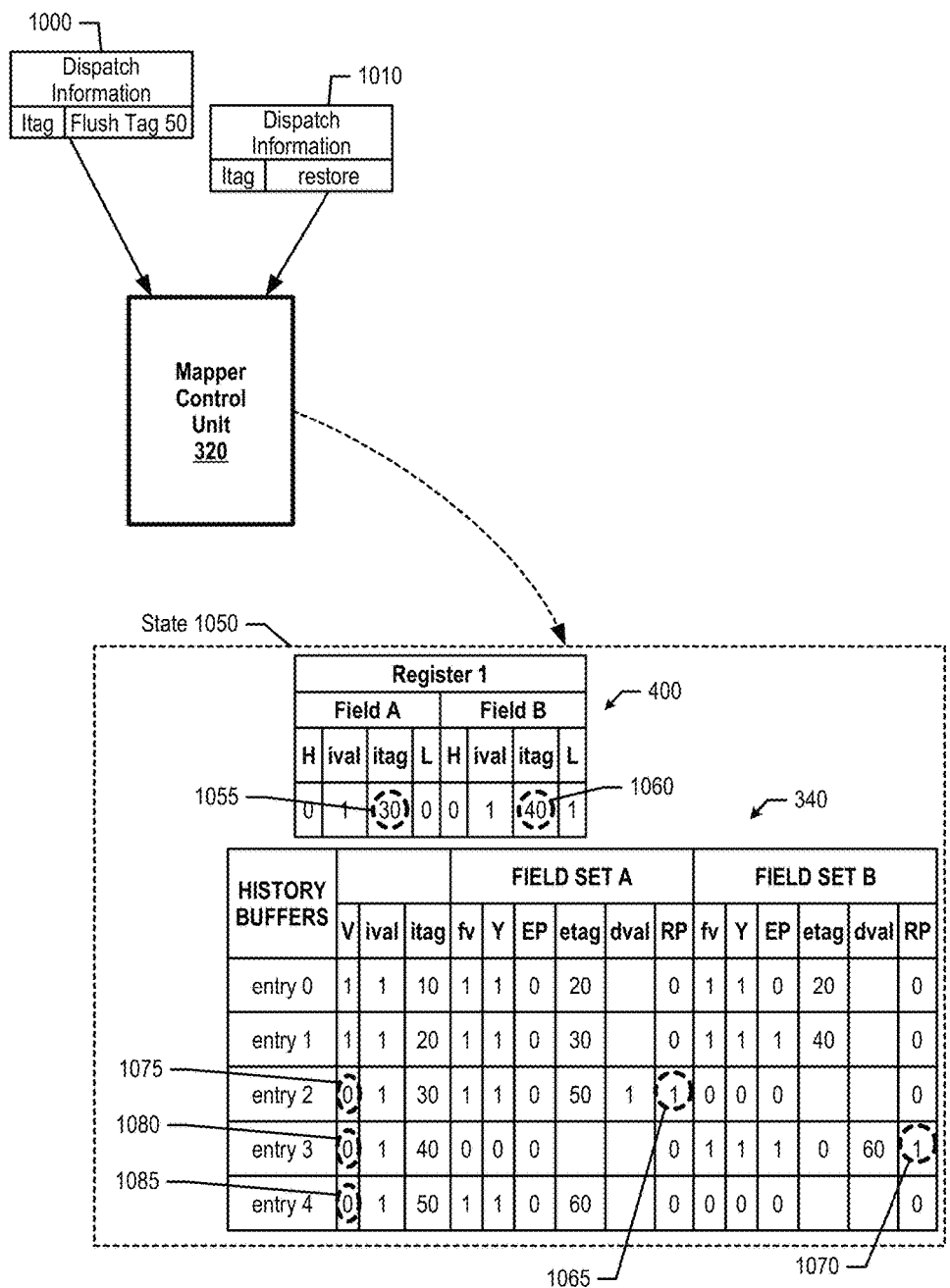
FIG. 10 is an exemplary diagram depicting a mapper control unit receiving a flush tag and a restore command.

FIG. 10 is an exemplary diagram depicting a mapper control unit receiving a flush tag and a restore command. Mapper control unit 320 receives information 1000 from a completion control unit, which includes a flush tag of 50. As such, mapper control unit 320 asserts a recovery pending (RP) bit for each field that has an etag younger than or equal to the ftag in each entry that has itag older than the ftag (1065 and 1070).

Mapper control unit receives restore 1010 and, as such, restores fields with RP=1 to the register to reconstruct the appropriate state 1050. This includes invalidating history buffer entries with etags younger than or equal to the ftag (1075, 1080, 1085). As can be seen, mapper control unit 320 restores register 400's field A using entry 2, which includes storing the result data from FIG. 8 into register field A's data field (not shown). Mapper control unit 320 restores register 400's field B using entry 3, thus showing that mapper control unit 320 may utilize different history buffer entries to restore different register fields.

Figure 11:
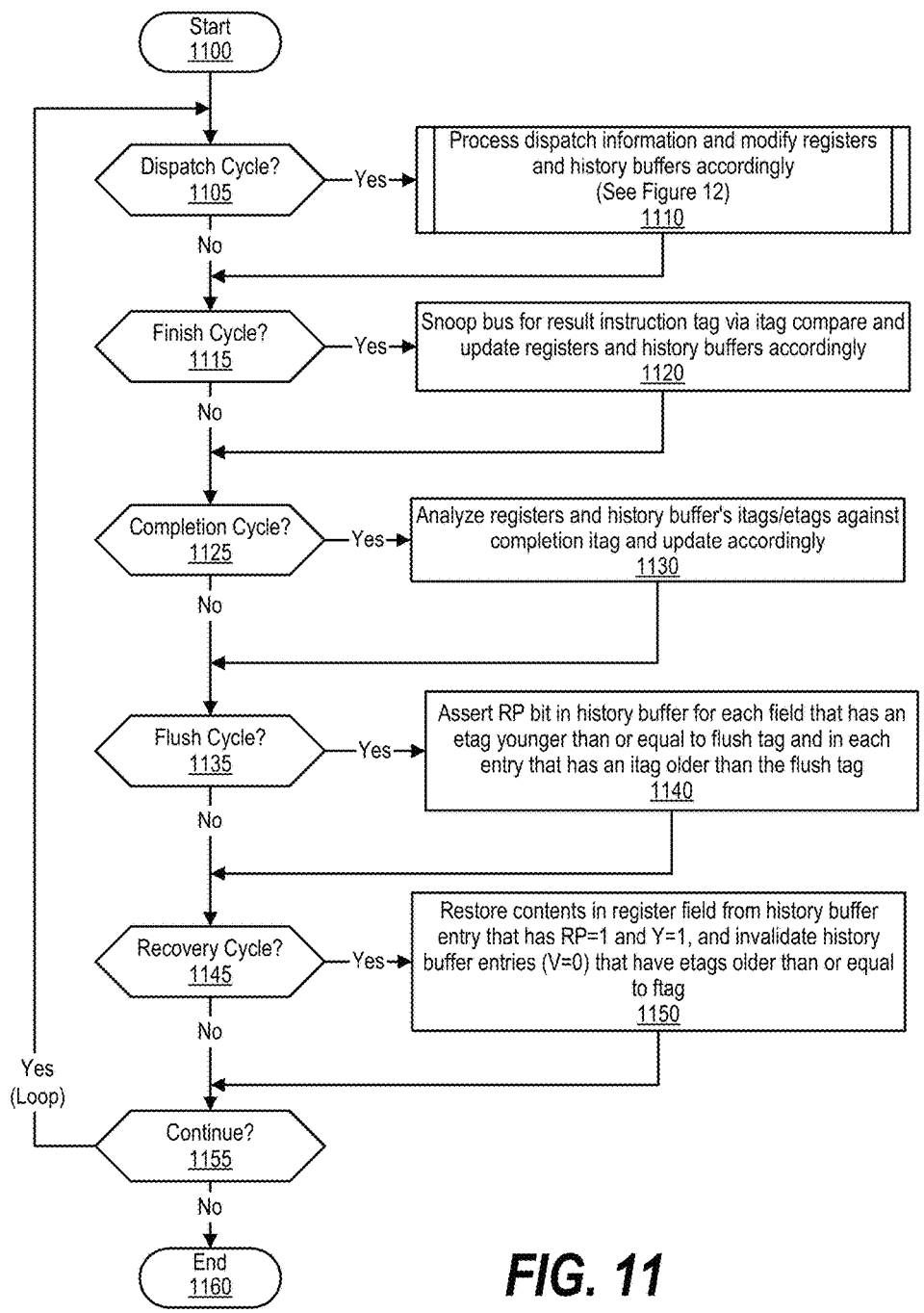
FIG. 11 is a high-level exemplary flowchart depicting steps taken by a mapper control unit to process various processor cycles.

FIG. 11 is a high-level exemplary flowchart depicting steps taken by a mapper control unit to process various processor cycles. Processing commences at 1100, whereupon the process determines as to whether a dispatch cycle occurs, such as by receiving dispatch information shown in FIG. 5 (decision 1105). If a dispatch cycle occurs, then decision 1105 branches to the 'yes' branch. At pre-defined process block 1110, the process processes the dispatch information and modifies registers and history buffers accordingly (see FIG. 12 and corresponding text for further details). On the other hand, if a dispatch cycle does not occur, then decision 1105 branches to the 'no' branch.

The process determines as to whether a finish cycle is occurring (decision 1115). If a finish cycle is occurring, then decision 1115 branches to the 'yes' branch. At step 1120, the process snoops result buses via itag compare and updates registers and history buffers accordingly (see FIG. 8 and corresponding text for further details). In one embodiment, regarding the register fields, the process snoops the result bus via itag compare and, if a register field's itag matches the result bus itag, then the process stores the result data in the field's data field and asserts the field's corresponding data valid bit. Regarding the history buffer, in one embodiment, the process snoops results buses via itag compares and, if a history buffer entry's itag matches the result bus itag, for each field that has fv=1, the process stores the result data in the corresponding data field and asserts the corresponding data valid bit. On the other hand, if a finish cycle is not occurring, then decision 1115 branches to the 'no' branch.

The process determines as to whether a completion cycle is occurring (decision 1125). If a completion cycle is occurring, then decision 1125 branches to the 'yes' branch. At step 1130, the process analyzes registers and history buffer's itags/etags against a completion itag and updates the history buffers and registers accordingly. In one embodiment, regarding the register fields, when the field's itag matches a completion itag, the process clears the itag valid bit so that itag can be reused. On the other hand, if a completion cycle is not occurring, then decision 1125 branches to the 'no' branch.

The process determines as to whether a flush cycle is occurring (decision 1135). If a flush cycle is occurring, then decision 1135 branches to the 'yes' branch. At step 1140, the process asserts recovery pending (RP) bits in the history buffer for each field that has an etag younger than or equal to the flush tag and in each entry that has an itag older than the flush tag (see FIG. 10 and corresponding text for further details). On the other hand, if a flush cycle is not occurring, then decision 1135 branches to the 'no' branch.

The process determines as to whether a recovery cycle is occurring (decision 1145). If a recovery cycle is occurring, which may be a multi-cycle process, then decision 1145 branches to the 'yes' branch. At step 1150, the process restores contents in register fields from history buffer entries that have RP=1 and Y=1, and invalidates history buffer entries (V=0) that have etags older than or equal to the ftag (see FIG. 10 and corresponding text for further details). On the other hand, if a recovery cycle is not occurring, then decision 1145 branches to the 'no' branch.

The process determines as to whether to continue (decision 1155). If the process should continue, then decision 1155 branches to the 'yes' branch, which loops back to process another cycle. On the other hand, if the process should not continue, then decision 1155 branches to the 'no' branch. FIG. 11 processing thereafter ends at 1160.

Figure 12:
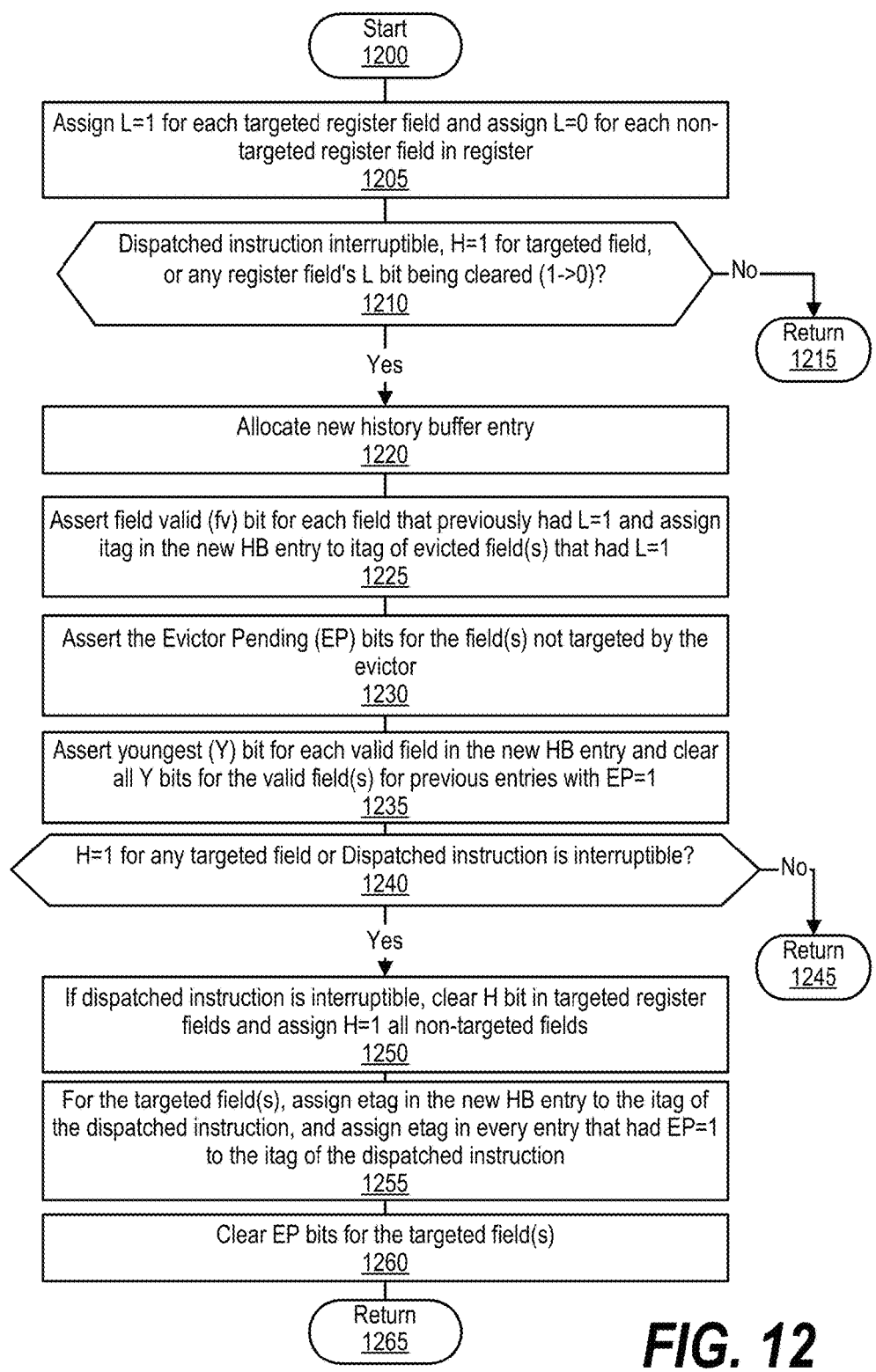
FIG. 12 is an exemplary flowchart depicting steps taken by a mapper control unit to process dispatch information.

FIG. 12 is an exemplary flowchart depicting steps taken by a mapper control unit to process dispatch information. Processing commences at 1200, whereupon at step 1205, the process assigns L=1 for each targeted register field and assigns L=0 for each non-targeted register field in a register.

The process determines as to whether the corresponding dispatched instruction is interruptible, H=1 for targeted field, or any register field's L bit is being cleared (1→0) (decision 1210). If none of the above conditions are true, then decision 1210 branches to the 'no' branch. FIG. 12 processing thereafter returns to the calling routine (see FIG. 11) at 1215.

On the other hand, if at least one of these conditions are true, then decision 1210 branches to the 'yes' branch. At step 1220, the process allocates a new history buffer entry in dynamic history buffer 340. At step 1225, the process asserts the field valid (fv) bit in each history buffer field set that previously had L=1 in the corresponding register field, and assigns the itag bits in the new history buffer entry to the itag of the evicted field(s) that had L=1.

At step 1230, the process asserts the Evictor Pending (EP) bits for the history buffer field sets corresponding to the register fields not targeted by the dispatched instruction. The process, at step 1235, asserts a youngest (Y) bit for each valid history buffer field set in the new history buffer entry and clears the Y bits for previous history buffer field sets with EP=1.

The process determines as to whether H=1 for any targeted register field or the dispatched instruction is interruptible, which is a subset of conditions from decision 1210 discussed above (decision 1240). If H does not equal 1 for a targeted field and the dispatched instruction is not interruptible, then decision 1240 branches to the 'no' branch. FIG. 12 processing thereafter returns to the calling routine (see FIG. 11) at 1245.

On the other hand, if H=1 for at least one targeted register field or the dispatched instruction is interruptible, then decision 1240 branches to the 'yes' branch. At step 1250, if the dispatched instruction is interruptible, the process clears the H bit in the targeted register fields and assigns H=1 to the non-targeted register fields. At step 1255, for the targeted register field(s), the process assigns an etag in the new history buffer entry to the itag of the dispatched instruction, and assigns an etag in each history buffer entry that had EP=1 to the itag of the dispatched instruction. At step 1260, the process clears the EP bits in the history buffer field sets corresponding to the targeted field(s), and FIG. 12 processing thereafter returns to the calling routine (see FIG. 11) at 1265.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   matching a result instruction tag corresponding to an executed instruction to an instruction tag included in a history buffer entry, wherein the history buffer entry comprises a single itag field and a plurality of history buffer field sets, and wherein each of the plurality of history buffer field sets includes a field set state field and a data field;
   determining that a first portion of the plurality of history buffer field sets includes a valid field set state indicator in their corresponding field set state field, wherein a second portion of the plurality of history buffer field sets fails to include the valid field set state indicator;
   storing result data corresponding to the result instruction tag in the first portion of history buffer field sets without storing the result data in the second portion of history buffer field sets in response to determining that the first portion of history buffer field sets includes the valid field set state indicator and that the second portion of history buffer field sets fails to include the valid field set state indicator; and
   in response to receiving a flush tag, restoring a register utilizing the first portion of history buffer field sets and not utilizing the second portion of history buffer field sets, wherein the restoring includes copying the result data from at least one of the first portion of history buffer field sets to at least one of a plurality of register fields included in the register.

2. The method of claim 1 wherein the restoring further comprises:
   determining that the instruction tag is older than the flush tag and a selected one of the first portion of history buffer field sets includes an evictor tag that is younger than or equal to the flush tag; and
   storing first content from the selected history buffer field set into a first one of the plurality of register fields.

3. The method of claim 2 further comprising:
   analyzing a different history buffer entry that includes a different instruction tag;
   determining that the different instruction tag is older than the flush tag and a different field set included in the different history buffer entry includes a different evictor tag that is younger than or equal to the flush tag; and
   storing second content from the different field set into a second one of the plurality of register fields.

4. The method of claim 1 wherein each of the plurality of history buffer field sets includes at least an evictor tag field, a data valid field, and a recovery pending field.

5. The method of claim 1 wherein, prior to receiving the result instruction tag, the method further comprises:
receiving dispatch information corresponding to the executed instruction, wherein the dispatch information identifies a subset of the plurality of register fields included in a register;
selecting the history buffer entry included in a history buffer; and
modifying the first portion of the history buffer field sets using existing content from the identified subset of register fields.

6. The method of claim 5 further comprising:
dynamically configuring a data width of each of the data fields in each of the first portion of the history buffer field sets based upon the existing content stored in the identified subset of register fields.

7. The method of claim 1 wherein the register is an exception and status register.

8. An information handling system comprising:
one or more processors;
a memory coupled to at least one of the processors; and
a set of computer program instructions stored in the memory and executed by at least one of the processors in order to perform actions of:
matching a result instruction tag corresponding to an executed instruction to an instruction tag included in a history buffer entry, wherein the history buffer entry comprises a single itag field and a plurality of history buffer field sets, and wherein each of the plurality of history buffer field sets includes a field set state field and a data field;
determining that a first portion of the plurality of history buffer field sets includes a valid field set state indicator in their corresponding field set state field, wherein a second portion of the plurality of history buffer field sets fails to include the valid field set state indicator;
storing result data corresponding to the result instruction tag in the first portion of history buffer field sets without storing the result data in the second portion of history buffer field sets in response to determining that the first portion of history buffer field sets includes the valid field set state indicator and that the second portion of history buffer field sets fails to include the valid field set state indicator; and
in response to receiving a flush tag, restoring a register utilizing the first portion of history buffer field sets and not utilizing the second portion of history buffer field sets, wherein the restoring includes copying the result data from at least one of the first portion of history buffer field sets to at least one of a plurality of register fields included in the register.

9. The information handling system of claim 8 wherein the one or more processors perform additional actions comprising:
determining that the instruction tag is older than the flush tag and a selected one of the first portion of history buffer field sets includes an evictor tag that is younger than or equal to the flush tag; and
storing first content from the selected history buffer field set into a first one of the plurality of register fields.

10. The information handling system of claim 9 wherein the one or more processors perform additional actions comprising:
analyzing a different history buffer entry that includes a different instruction tag;
determining that the different instruction tag is older than the flush tag and a different field set included in the different history buffer entry includes a different evictor tag that is younger than or equal to the flush tag; and
storing second content from the different field set into a second one of the plurality of register fields.

11. The information handling system of claim 8 wherein each of the plurality of history buffer field sets includes at least an evictor tag field, a data valid field, and a recovery pending field.

12. The information handling system of claim 8 wherein, prior to receiving the result instruction tag, the one or more processors perform additional actions comprising:
receiving dispatch information corresponding to the executed instruction, wherein the dispatch information identifies a subset of the plurality of register fields included in a register;
selecting the history buffer entry included in a history buffer; and
modifying the first portion of the history buffer field sets using existing content from the identified subset of register fields.

13. The information handling system of claim 12 wherein the one or more processors perform additional actions comprising:
dynamically configuring a data width of each of the data fields in each of the first portion of history buffer field sets based upon the existing content stored in the identified subset of register fields.

14. The information handling system of claim 8 wherein the register is an exception and status register.

15. A computer program product stored in a computer readable storage medium, comprising computer program code that, when executed by an information handling system, causes the information handling system to perform actions comprising:
matching a result instruction tag corresponding to an executed instruction to an instruction tag included in a history buffer entry, wherein the history buffer entry comprises a single itag field and a plurality of history buffer field sets, and wherein each of the plurality of history buffer field sets includes a field set state field and a data field;
determining that a first portion of the plurality of history buffer field sets includes a valid field set state indicator in their corresponding field set state field, wherein a second portion of the plurality of history buffer field sets fails to include the valid field set state indicator;
storing result data corresponding to the result instruction tag in the first portion of history buffer field sets without storing the result data in the second portion of history buffer field sets in response to determining that the first portion of history buffer field sets includes the valid field set state indicator and that the second portion of history buffer field sets fails to include the valid field set state indicator; and
in response to receiving a flush tag, restoring a register utilizing the first portion of history buffer field sets and not utilizing the second portion of history buffer field sets, wherein the restoring includes copying the result data from at least one of the first portion of history buffer field sets to at least one of a plurality of register fields included in the register.

16. The computer program product of claim 15 wherein the information handling system performs additional actions comprising:

determining that the instruction tag is older than the flush tag and a selected one of the first portion of history buffer field sets includes an evictor tag that is younger than or equal to the flush tag; and storing first content from the selected history buffer field set into a first one of the plurality of register fields.

17. The computer program product of claim 16 wherein the information handling system performs additional actions comprising:

analyzing a different history buffer entry that includes a different instruction tag;

determining that the different instruction tag is older than the flush tag and a different field set included in the different history buffer entry includes a different evictor tag that is younger than or equal to the flush tag; and storing second content from the different field set into a second one of the plurality of register fields.

18. The computer program product of claim 15 wherein each of the plurality of history buffer field sets includes at least an evictor tag field, a data valid field, and a recovery pending field.

19. The computer program product of claim 15 wherein, prior to receiving the result instruction tag, the information handling system performs additional actions comprising:

receiving dispatch information corresponding to the executed instruction, wherein the dispatch information identifies a subset of the plurality of register fields included in a register;

selecting the history buffer entry included in a history buffer; and modifying the first portion of the history buffer field sets using existing content from the identified subset of register fields.

20. The computer program product of claim 19 wherein the information handling system performs additional actions comprising:

dynamically configuring a data width of each of the data fields in each of the first portion of history buffer field sets based upon the existing content stored in the identified subset of register fields.

* * * * *